No. 763,744. PATENTED JUNE 28, 1904.
G. W. FORSBERG.
PLUG TOBACCO PRESS.
APPLICATION FILED JAN. 28, 1904.
NO MODEL. 6 SHEETS—SHEET 1.

WITNESSES:
Franck L. Ourand.
W. Parker Rindell

INVENTOR
G. W. Forsberg.
BY D. C. Rindell
Attorney

No. 763,744. PATENTED JUNE 28, 1904.
G. W. FORSBERG.
PLUG TOBACCO PRESS.
APPLICATION FILED JAN. 28, 1904.
NO MODEL. 6 SHEETS—SHEET 2.

WITNESSES: INVENTOR
Franck L. Ourand. G. W. Forsberg.
W. Parker Reinohl. By D. C. Reinohl.
Attorney No. 763,744. PATENTED JUNE 28, 1904.
G. W. FORSBERG.
PLUG TOBACCO PRESS.
APPLICATION FILED JAN. 28, 1904.
NO MODEL. 6 SHEETS—SHEET 3.
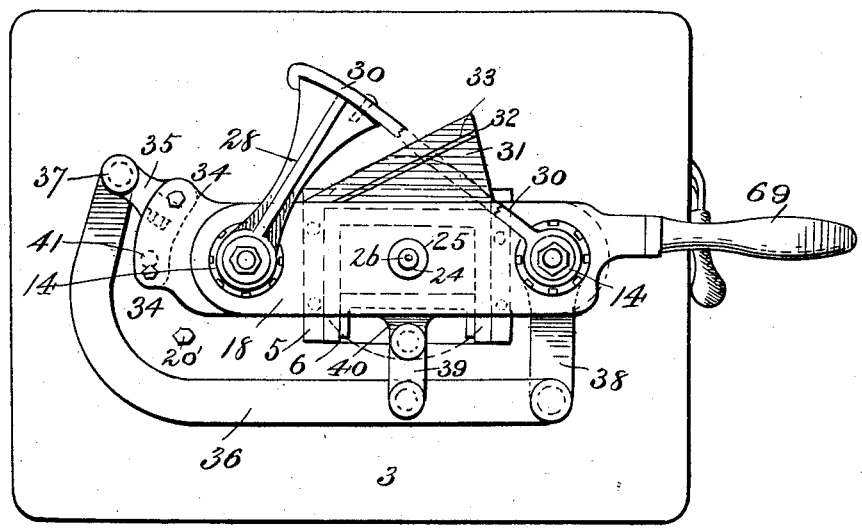
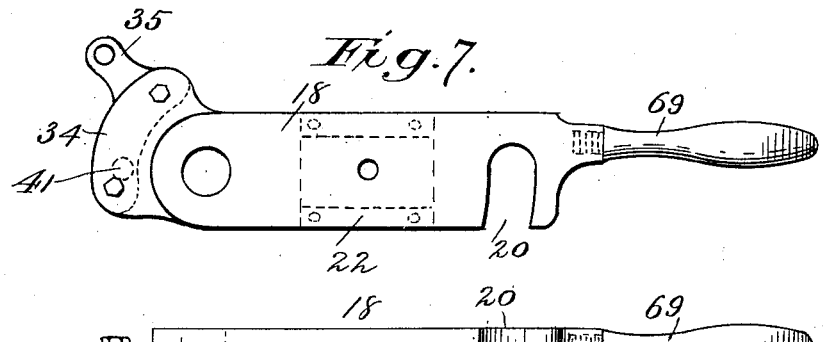
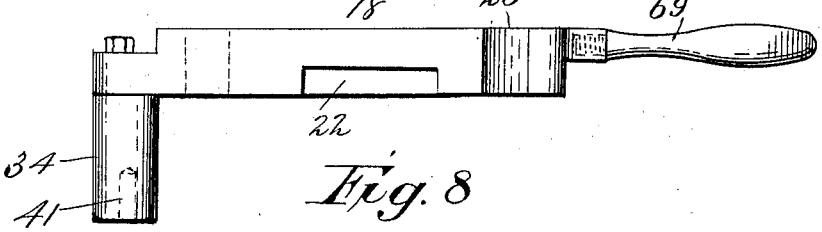
WITNESSES:
Franck L. Ourand.
W. Parker Reinohl.
INVENTOR
G. W. Forsberg.
BY D. L. Reinohl
Attorney No. 763,744. PATENTED JUNE 28, 1904.
G. W. FORSBERG.
PLUG TOBACCO PRESS.
APPLICATION FILED JAN. 28, 1904.
NO MODEL. 6 SHEETS—SHEET 4.
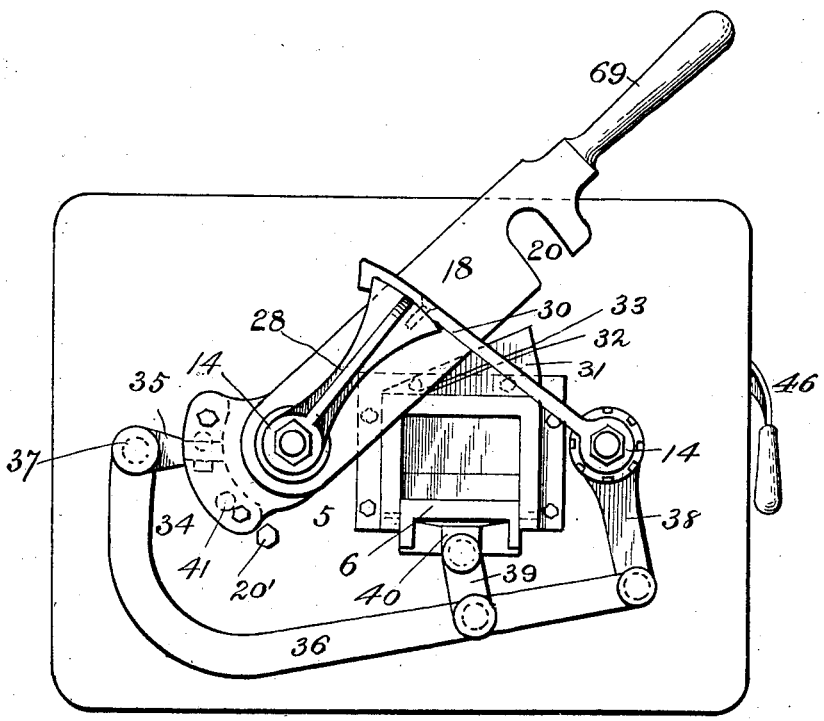
Fig. 4.
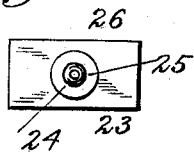
Fig. 9.
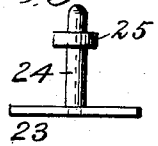
Fig. 10.
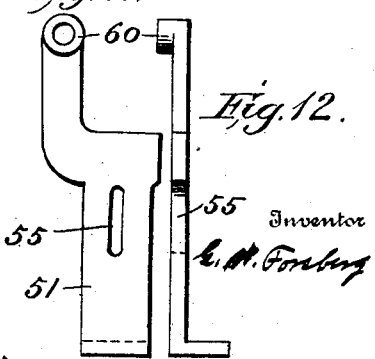
Fig. 11.
Fig. 12.
Witnesses
F. L. Ourand.
W. Parker Reinohl.
Inventor
G. W. Forsberg
By D. L. Reinohl Attorney No. 763,744. PATENTED JUNE 28, 1904.
G. W. FORSBERG.
PLUG TOBACCO PRESS.
APPLICATION FILED JAN. 28, 1904.
NO MODEL. 6 SHEETS—SHEET 6.

Witnesses
Franck L. Ourand
W. Parker Reinohl

Inventor
G. W. Forsberg.
By D. R. Reinohl
Attorney

No. 763,744. Patented June 28, 1904.

UNITED STATES PATENT OFFICE.

GUSTAVE W. FORSBERG, OF WASHINGTON, DISTRICT OF COLUMBIA.

PLUG-TOBACCO PRESS.

SPECIFICATION forming part of Letters Patent No. 763,744, dated June 28, 1904.

Application filed January 28, 1904. Serial No. 190,960. (No model.)

*To all whom it may concern:*

Be it known that I, GUSTAVE W. FORSBERG, a citizen of the United States, residing at Washington, in the District of Columbia, have invented certain new and useful Improvements in Plug-Tobacco Presses; and I do hereby declare the following to be a full, clear, and exact description of the invention, such as will enable others skilled in the art to which it appertains to make and use the same.

My invention relates to presses for the manufacture of plug-tobacco and like purposes, and has for its object simplicity in construction, safety in operation, durability, economy in the application of the motor fluid, and the application of different degrees of pressure to the article made in the press.

The invention consists in certain improvements in construction, which will be fully disclosed in the following specification and claims.

Figure 1:
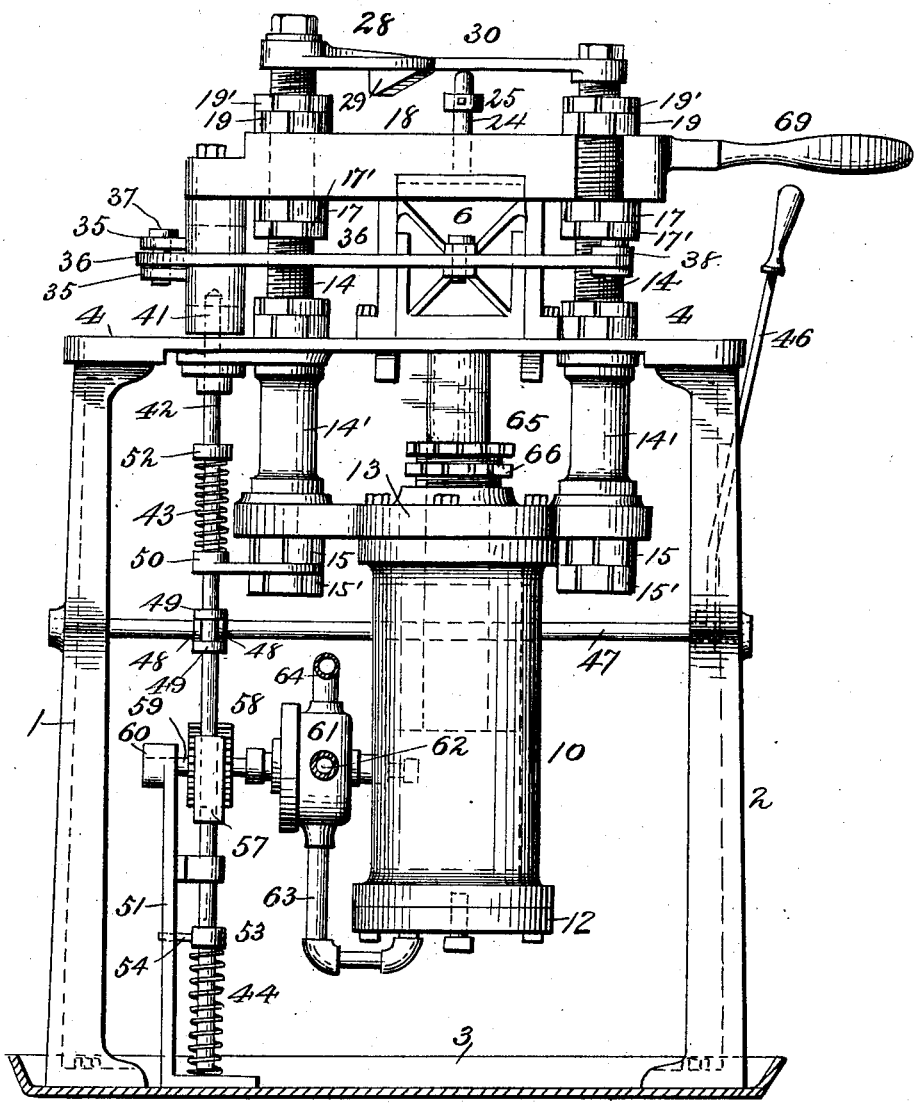
Figure 2:
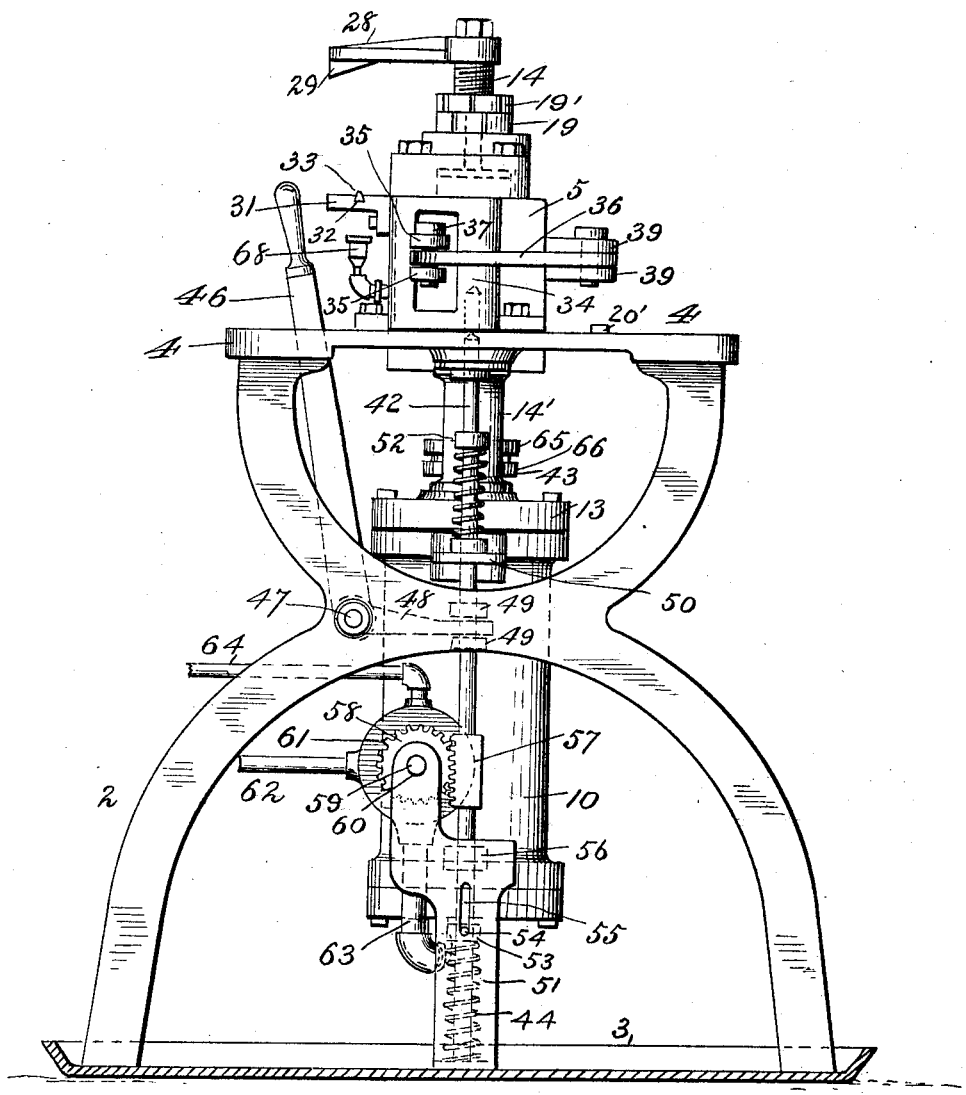
Figure 5:
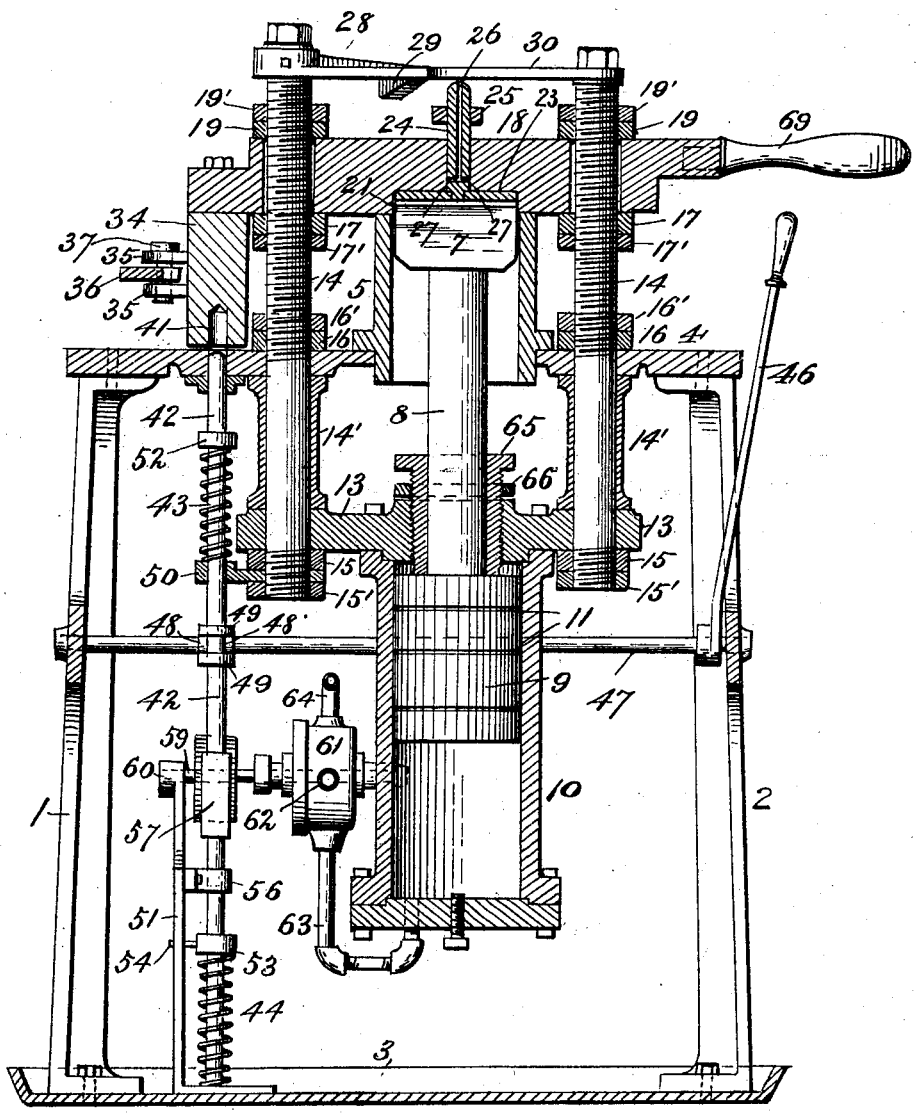
Figure 6:
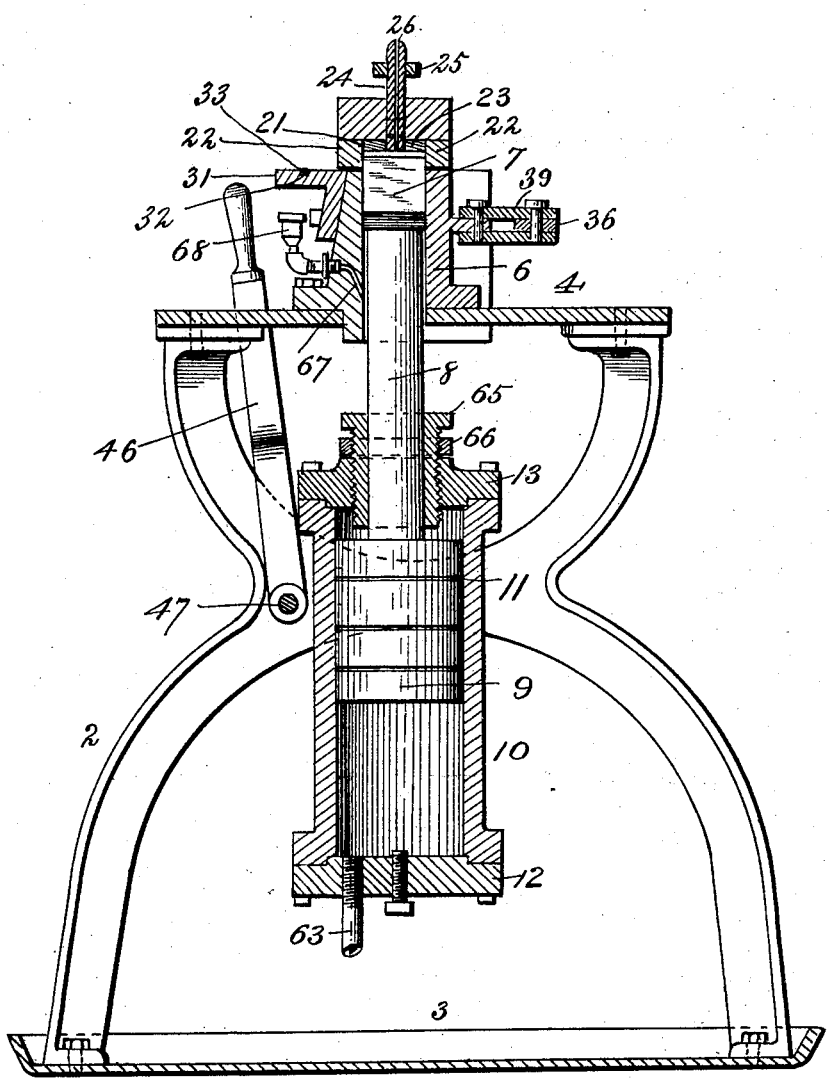

In the accompanying drawings, which form part of this specification, Figure 1 represents a front elevation of my improved press; Fig. 2, a side view of the same; Fig. 3, a top plan view showing the mold closed; Fig. 4, a like view showing the mold open or uncovered; Fig. 5, a vertical longitudinal section, partly in elevation; Fig. 6, a vertical transverse section, partly in elevation; Fig. 7, a top plan of the mold-cover detached; Fig. 8, a side elevation of the same; Fig. 9, a top plan of the ejector detached; Fig. 10, a side view of the same; Fig. 11, a front elevation of the bracket supporting the valve-stem and the valve-operating rod, and Fig. 12 a side elevation of the same.

Reference being had to the drawings and the designating characters thereon, 1 2 are the frame-sections on which the machine is supported and preferably rest in a pan or tray 3 to arrest any liquid which may escape from the press-mold or the hydraulic cylinder.

4 is the base-plate which rests upon and is properly secured to the frame-sections 1 2. On the base-plate rests the press-mold 5, which preferably extends through the plate, as shown in Figs. 1, 2, 5, and 6, is open at its top and bottom, and is provided with a laterally-movable side 6 and a vertically-movable plunger 7, which forms the working bottom of the mold. The plunger is connected to or forms part of the piston-rod 8, the piston 9 of which is made longer than usual to cause it to gravitate to the bottom of the cylinder 10 and discharge the motor fluid from the cylinder after each compression-stroke of the piston. On the piston 9 are concentric grooves 11 to form a liquid packing for the piston. The cylinder is provided with a detachable bottom 12 and a head 13 and is suspended from the base-plate 4 by bolts or rods 14, on which the pressure of the piston 9 is exerted, and are provided with tubular columns 14' between the base-plate and the head 13, which space the cylinder from the base-plate. The bolts are provided with nuts 15 and lock-nuts 15' under the cylinder-head 13, nuts 16 and lock-nuts 16' above the base-plate 4, nuts 17 and lock-nuts 17' under or below the mold-cover 18, and nuts 19 and lock-nuts 19' above the cover.

The cover 18 is loosely mounted and swings laterally on one of the bolts 14, is provided with a slot 20, which engages the opposite bolt 14 between the nuts 17 and 19, and is limited in its movement and brought directly over the press-mold 5 thereby, and its outward movement to uncover the mold is limited by a bolt 20' in the base-plate, which is engaged by the extension 34 of the mold-cover 18. In the under side of the cover 18 is a cavity 21 the dimensions of a plug of tobacco or other article to be made in the press, the side walls 22 of which cavity are secured to the cover in any preferred manner.

23 is an ejector contained in and fitting closely the cavity 21 for expelling or ejecting the plug of tobacco formed between the upper face of the plunger 7 and the bottom or lower face of the ejector 23. The ejector is provided with a stem 24, which extends through the upper side of the cover, is provided with a nut or collar 25 to limit the descent of the ejector, and in the stem is a vertical passage 26, having lateral discharge-passages 27 to lubricate the ejector and to allow air to enter the cavity above the ejector to destroy the vacuum therein and permit the ejector to gravitate to its normal position (flush with the under side of the cover 18) after the plug has been forcibly ejected.

On one of the bolts 14 is secured a horizontal arm 28, provided with an inclined projection 29 on its under side in the path of and is engaged by the outer end of the ejector-stem 24 as the cover is moved away from the mold, and the ejector is depressed and the plug forcibly discharged from the cavity 21. Secured to the opposite bolt 14 is a brace-rod 30, whose outer end is secured to the outer end of the arm 28, as shown in Figs. 1, 3, 4, and 5, to stiffen said arm. To the side of the mold, with its upper edge in the plane of the upper edge of the mold, is secured a shearing-plate 31, which is engaged by that portion of the cover which passes over it as the cover is returned to the mold and by the lower side or face of the ejector to shear off any particles of tobacco that may adhere to them, and in the upper or working face of the shearing-plate is a groove 32, in which is a wiper 33, of felt or other suitable material, to contain or hold a lubricant to be applied to the face of the ejector and the cover to prevent tobacco adhering thereto as much as possible.

Depending from the cover 18 and properly secured thereto or forming part thereof is a vertical extension 34, which extends down to the base-plate 4, and to lugs 35 therein is pivotally connected a horizontal bar 36 by a bolt 37, and the opposite end of said bar is pivotally connected to the outer end of a swinging link 38, loosely mounted on one of the bolts 14, and intermediate the two ends of said bar 36 is a toggle-bar connection 39 with said bar 36 and a lug 40 on the laterally-movable side 6 of the mold, the leverage of the bar 36 and its connections with the cover 18 and the side 6 being so augmented that on the closing stroke of the cover to bring it over the mold the side 6 is forced in and compresses the tobacco or other material in the mold laterally before the plunger-bottom 7 begins its compression-stroke.

To provide absolute safety against injury to the operator of the machine while charging the mold by premature moving of any of the parts of the machine, the machine is locked when the mold is uncovered and is unlocked by the operator when the cover is being returned to its position over the mold, and to effect which desirable and important condition the extension 34 of the mold-cover 18 is provided with a vertical opening 41, Figs. 1, 2, 3, 4, and 5, which is engaged by the upper end of the valve-operating rod 42, projected therein by springs 43 44 on the rod when they open the supply-valve 61 and turn on the motor fluid to the cylinder 10. The machine is unlocked by a lever 46, connected to a shaft 47, supported in the frame 1 2, and said shaft is connected to the valve-rod 42 by an arm 48, secured to the shaft 47 and engaging the valve-rod between collars 49. The valve-rod is guided by a bracket 50, extending from one of the bolts 14, and rests upon and is further guided by a bracket 51. The springs 43 and 44 rest, respectively, upon the brackets 50 and 51, and their tension is regulated by the movable collars 52 and 53, from the latter one of which projects a pin 54, which engages a vertical slot 55 in the bracket 51 and prevents the rod turning axially. The rod 42 passes through a guide 56 on the bracket to hold it in perfect alinement, and on the rod is a toothed rack 57, which engages a pinion 58 on the valve-stem 59. Supported at its outer end is a bearing 60 in the upper end of the bracket.

The valve 61 is provided with a feed-pipe 62, which communicates with a tank (not shown) in which a motor fluid, preferably oil, is stored under pressure supplied by a suitable pump, a pipe 63, through which the fluid passes from the valve to the cylinder and returns to the valve, and a pipe 64, through which the fluid is discharged and returned to a suitable return-tank, (not shown,) from which it is used over and over again.

Through the cylinder-head 13 and preferably surrounding the piston-rod 8 extends a tubular nut 65, externally screw-threaded to engage a like thread in the head, and is provided with a lock-nut 66, the purpose of which is to vary the degree of thickness of the plug in the cavity in the cover 18 by adjusting said nut and limiting or arresting the piston 9 and the plunger 7 in their upward or power stroke.

The plunger 7 is lubricated through one or more ducts 67, supplied from an oil-cup 68.

In the operation of the machine the tobacco suitably weighed is thrown into the mold 5, when the operator seizes the handle 69 and draws the cover 18 toward the mold, and as soon as the opening 41 registers with the upper end of the valve-rod 42 the springs 43 and 44 project the upper end of the rod into the opening and automatically turns on the motor fluid to the cylinder 10. The mold-cover in its travel causes the bar 36 and its connections to move the side 6 of the mold inward and compress the tobacco laterally in advance of the ascent of the plunger 7, which then completes the compression of the tobacco and transfers it from the mold into the cavity 21 in the cover 18, in which the plug of tobacco is formed. When the cover 18 is directly over the mold, the cover is locked in this position and no part of the machine can move accidentally; but the plunger 7 commences its compression-stroke the instant the cover has been brought into position over the mold and the valve 61 has been opened. As soon as the compression of the plug has been completed by the piston 9 and the plunger 7 reaching the end of their upward stroke, regulated by the nut 65, the operator unlocks the machine by the use of lever 46, which withdraws the valve-rod 42 from the opening 41 and shuts off the supply of motor fluid to the cylinder 10 and opens the discharge-pipe 64, which allows the piston 9 to descend by gravity, carrying with it the plunger 7 of the mold. The cover 18 is then moved laterally away from and the mold uncovered and the plug of tobacco ejected from the cavity 21. During this travel of the cover 18 and in its return stroke to the mold the upper end of the rod 42 bears against the bottom of the extension 34 until the opening 41 registers with the valve-rod and the cover has assumed its proper position over the mold 5, when the rod is projected into the opening 41 and the machine again locked.

It is obvious that the machine may be used under different degrees of pressure, controlled by the pressure of the motor fluid in the pressure-tank, and a number of machines may be connected to the pressure-tank and all operated at will and that the press may be used for operating upon other material than tobacco without departing from the spirit of my invention.

Having thus fully described my invention, what I claim is—

1. A press-mold having a movable plunger forming the bottom of the mold, a cylinder and piston for operating the plunger, a laterally-movable cover for the mold, and connections for automatically locking the cover.

2. A press-mold having a movable plunger forming the bottom of the mold, a cylinder and piston for operating the plunger, a laterally-movable side for the mold, a cover for the mold, connections therewith for operating the movable side, and connections for locking the cover.

3. A press-mold having a movable plunger forming the bottom of the mold, a cylinder and piston for operating the plunger, a cover for the mold, and means controlled by said cover for turning on the motor fluid.

4. A press-mold having a movable plunger forming the bottom of the mold, a cylinder and piston for operating the plunger, a cover for the mold and connections therewith to lock the cover, means controlled by said cover for supplying motor fluid to said cylinder, and means for shutting off the motor fluid.

5. A press-mold having a movable plunger forming the bottom of the mold, a cylinder and piston for operating the plunger, a cover for the mold, a valve for supplying motor fluid to said cylinder, and a rod connected to said valve and engaging said cover.

6. A press-mold having a vertically-movable plunger forming the bottom of the mold, a cylinder and piston for operating the plunger, a cover for the mold, a valve controlling ingress and egress of the motor fluid to and from said cylinder, a rod connected to said valve and intermittently engaging said cover, and means for disengaging the rod from the cover.

7. A press-mold having a vertically-movable plunger forming the bottom of the mold, a cylinder and piston for operating the plunger, a valve controlling the motor fluid supplied to the cylinder, a rod connected to said valve and engaging said cover, a bracket supporting the valve-stem and the valve-rod, and provided with means for guiding the rod, and means for automatically effecting intermittent engagement of said rod with said cover.

8. A press-mold having a vertically-movable plunger forming the bottom of the mold, means for raising said plunger, a laterally-movable side of the mold, a movable cover for the mold, and connections between said side and said cover for moving said side.

9. A fixed press-mold having a vertically-movable plunger forming the bottom of the mold, a cylinder provided with a piston connected to said plunger, a laterally-movable side of the mold, a movable cover for the mold having a cavity in the under side thereof to receive the article pressed, and connections between said movable side and said cover, for the purpose described.

10. A press-mold having a laterally-movable cover provided with a cavity in the under side thereof to receive the article pressed, an ejector in said cavity, a laterally-movable side of the mold, and connections between the cover and the side for operating both synchronously.

11. A press-mold having a cover provided with a cavity to receive the article pressed, an ejector in and fitting said cavity, and a passage open to the atmosphere for supplying a lubricant and air to the cavity above the ejector.

12. A press-mold having a laterally-movable cover provided with a cavity to receive the article pressed, an ejector in said cavity and having a rod extending through the cover, and means above the cover in the path of the rod for engaging the rod to discharge the article while the cover is being moved away from the mold.

13. A press-mold having a vertically-movable plunger forming the bottom of the mold; in combination with a cylinder provided with a piston connected to said plunger, and means extending through the cylinder-head and engaging the piston for regulating the thickness of the article pressed.

14. A press-mold having a vertically-movable plunger forming the bottom of the mold; in combination with a cylinder provided with a piston connected to said plunger, and an adjustable member extending into the cylinder and limiting the upward movement of the piston and the plunger.

15. A press-mold having a laterally-movable side, a vertically-movable plunger forming the bottom of the mold, and a laterally-movable cover for the mold; in combination with a bar connected at one end to said cover, at the opposite end to a fixed part of the machine, and to said side of the mold intermediate the ends of the bar.

16. A press-mold having a laterally-movable side, a vertically-movable plunger forming the bottom of the mold, and a laterally-movable cover for the mold; in combination with a bar pivotally connected at one end to said cover, a swinging connection between the opposite end of said bar and a fixed part of the machine, and a swinging connection between the bar and the movable side of the press-mold.

17. A press-mold having a laterally-movable side, a vertically-movable plunger forming the bottom of the mold, and a laterally-movable cover for the mold pivotally connected to a fixed part of the machine at one end, and provided with a slot at the opposite end to engage a fixed part of the machine.

18. A press-mold having a laterally-movable cover provided with a cavity to receive the article pressed, an ejector in said cavity whose face lies in the plane of the working face of the cover, and a shearing-plate on one side of the mold to engage the working face of said cover and ejector while the cover is being returned to the mold.

19. A press-mold having a laterally-movable cover provided with a cavity to receive the article pressed, an ejector in said cavity, and a shearing-plate on one side of the mold provided with means for lubricating the working face of the cover and the ejector while the cover is being returned to the mold.

20. A press-mold open at both its ends and having a movable plunger forming the bottom of the mold, a laterally-movable cover for the mold, a motor-cylinder in alinement with said mold, and bolts connected to the cylinder and loosely engaged by said cover.

21. A press-mold open at both its ends and having a movable plunger forming the bottom of the mold, a motor-cylinder in alinement with said mold, bolts connected to said cylinder, and a laterally-movable cover for the mold connected to one of said bolts to swing thereon and engaging the other bolt when the cover is over the mold.

22. A press-mold open at both its ends and having a movable plunger forming the bottom of the mold, a motor-cylinder in alinement with said mold, a laterally-movable cover for the mold, and bolts connecting the cylinder-head and the cover of the mold to sustain the thrust or pressure of the motor fluid operating upon the piston in the motor-cylinder.

23. A press-mold open at both its ends and having a movable plunger forming the bottom of the mold, a base-plate supporting the mold, a motor-cylinder, a laterally-movable cover for the mold, and bolts extending through the base-plate and engaging the head of the cylinder and said cover.

In testimony whereof I affix my signature in presence of two witnesses.

GUSTAVE W. FORSBERG.

Witnesses:
D. C. REINOHL,
W. PARKER REINOHL.